Patented Jan. 15, 1935

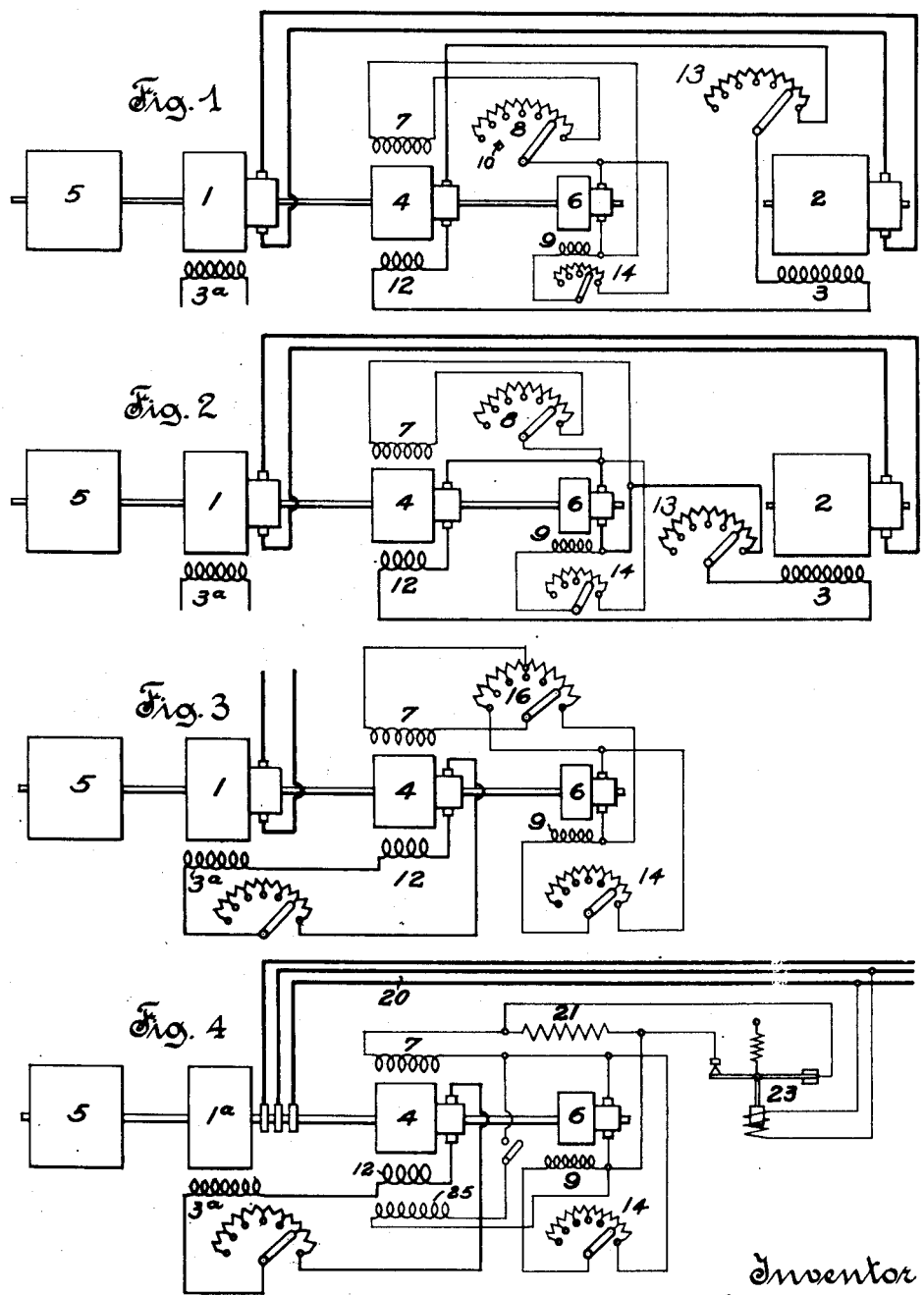

1,988,288

UNITED STATES PATENT OFFICE 1,988,288

DYNAMO-ELECTRIC MACHINE REGULATION

Nathan Wilkinson, Wauwatosa, Wis., assignor to Allis-Chalmers Manufacturing Company, Milwaukee, Wis., a corporation of Delaware Application December 30, 1929, Serial No. 417,424

8 Claims. (Cl. 172—239)

The present invention is concerned with the regulation of dynamo-electric machines whereby there is secured a desirably quickened degree of response of field energizing effects of such machines.

Due to the time constant incident to the presence of inductive effects of field energizing windings, variations in current flow in the field winding and consequent variations in the field flux of a dynamo-electric machine lag considerably behind the initiating action, whether manually or automatically exerted, to which the change in field flux or voltage of the machine is eventually responsive.

It is a general object of the present invention to improve or quicken the responsiveness of the regulation of dynamo-electric machines, especially machines of relatively large size and slow speed, and particularly to reduce the delay in response caused by inductive effects of the field energizing windings of the machines; and a further object is to effect the desired improvement in the degree of responsiveness of such apparatus by means and methods which have a minimum effect in wasteful dissipation of energy.

A preferred embodiment of the present invention includes the utilization of a separate generator supplying all or a portion of the excitation of the field energizing winding of the main machine in such a manner that it is capable of acting as a device for receiving or converting to useful purposes the stored energy incident to inherent inductive effects of such energizing winding and discharged during current-decreasing adjustment of the controlling or regulating apparatus, the exciting source being effective to act as a dynamic brake for restoring otherwise wasted energy during reduction of the main field energization, and preferably also constituting a source of augmentation of the normal rate of building-up of the field energization of the main machine following adjustment of the regulating apparatus to effect increased energization.

The above mentioned and other objects and advantages apparent from the disclosure hereinafter are attained through the present invention, various novel features of which will appear from the description and drawing forming a part of this application, disclosing embodiments of the invention, and will be more particularly pointed out in the claims hereinafter.

In the accompanying drawing:

Fig. 1 is a diagrammatic showing of a system embodying features of the present invention.

Figs. 2, 3 and 4 are diagrammatic showings of modified systems including features of the present invention.

In accordance with the disclosure of Fig. 1, wherein the invention is utilized in connection with the control of a direct current motor 2 which may be considered as of relatively large size such as is used for driving a rolling mill, the main source of field excitation of the motor 2 is a field winding 3 of the shunt type supplied from a source of separate excitation 4 of variable potential and driven from a prime mover or other suitable source of power 5, such as an electric motor, operating at substantially constant and sufficiently high speed. The motor 2 may be of the type wherein its direction of rotation and its speed throughout a portion of its range is determined by the direction and potential of the current supplied to the armature of the motor, as by a generator 1 provided with a field winding 3ª associated with means for regulating the current therein, and a further portion of the speed range, i. e. the higher operating speeds, may be secured through variation of the potential at the terminals of or current supplied to the winding 3, although the circuit of this winding may be provided with a conventional type of manually adjustable rheostat such as shown by 13 which may ordinarily remain adjusted during operation of the motor.

The main source of field excitation of the exciter 4 is a field winding 7, preferably supplied from an auxiliary or pilot exciter 6 which may also be driven by the prime mover 5 and may be operated as an essentially constant potential source, having its field excited by a shunt connected winding 9 whose circuit may be provided with a conventional form of rheostat 14 to insure such adjustment of the current in the field circuit as will provide the desired armature potential.

In the embodiment of the invention shown, the desired variation in the current through the winding 3 for ordinary speed controlling purposes is secured through operation of the controller 8, here shown as a manually operated rheostat, in the circuit of the winding 7 of the variable potential exciter 4, operation of this controller serving to vary the field energization of the exciter and consequently the potential developed at the armature terminals of this machine. The controller 8, whether automatically or manually operated, is preferably provided with a device, corresponding to the stop 10 of the controller shown, to insure that the current in the circuit of the winding 7 cannot be reduced below a predetermined minimum value corresponding to the desired minimum energization of the winding 3 which will prevent the motor 2 from running away.

In order to secure desirably quick variations in the speed of the motor 2, it is desirable to rapidly build up and decrease the effective field flux of this motor due to the winding 3. However, independently of how rapidly the resistance controller, in the present case the controller 8 in the circuit of the energizing winding 7 of the exciter 4, may be actuated, the desired variation or response of current in the winding 3 does not occur rapidly, primarily by reason of the time constant of the winding 3 incident to the inductive effects of this winding, it varying with the particular design of machine and being usually in the order of seconds before the current flowing in the winding is stabilized at that value corresponding to the newly adjusted position of the controller arm of the rheostat 8.

Various expedients have been utilized in the past for the purpose of reducing the time constant of the field energizing windings, this time constant being directly proportional to the inductance and inversely proportional to the resistance of the circuit. An ordinary expedient has been to include a relatively large non-inductive resistance in the circuit of the winding 3, but the use of such resistance introduces the undesirable feature of wasteful dissipation of a portion of the energy of the system.

In accordance with a feature of the present invention, an auxiliary field winding 12 is provided on main exciter 4, and this winding may be permanently connected in the armature circuit so as to exert a differential energizing effect, relative to the main winding 7, under normal or stable current conditions. This winding 12 is of a number of turns designed to effect the desired increased responsiveness during variations in the energization of the field winding 3.

Assuming that, in the operation of the system disclosed, it is desired to quickly increase the speed of the motor, this operation being effected by decreasing the current in the circuit of the winding 3, through actuation of the controller 8 to reduce the current in the circuit of the energizing winding 7 of the exciter 4, with consequent reduction of the potential applied to the terminals of the winding 3. On movement of the arm of the controller 8 to a position corresponding to reduction of the current in the energizing winding 3 to the desired point, the immediate effect is a decrease of the potential of the exciter 4. This reduction in potential at the exciter terminals due to reduced energization of its field does not effect an immediate decrease in current in the winding 3, for the latter, having a substantial time constant, is slow to reduce its current, and the inductively maintained voltage which dies down only relatively slowly, has the effect of causing the initially existing current to persist in the circuit, this inductively maintained current flowing in the armature circuit of the exciter in the same direction as that normally supplied by the exciter 4. With suitable design of the differential winding 12, the ampere turns now due to this winding are considerably in excess of the ampere turns due to the winding 7, the result being that the polarity of the field of the exciter 4 is reversed and the latter is now caused to operate as a motor; and this machine now serves as a means for consuming or dissipating the stored energy discharged from the field 3. This energy of discharge fed to the exciter 4 is thus converted to useful energy through the intermediary of the exciter and its driving shaft. As this stored energy drops below such a value that the energizing effect of the differential winding 12 no longer preponderates over that of the energizing winding 7 which may be assumed as furnishing its minimum energizing effects corresponding to the condition wherein the arm of the controller 8 is in the position associated with the stop 10, the machine 4 then begins to again build up its potential as a generator, due to the preponderating energizing effect of the winding 7, and continues to operate in this manner until the current in the circuit of the winding 3 becomes stable at its new value corresponding to the newly adjusted position of the controller 8, after which the motor 2 operates at its desired increased speed.

For purposes of illustration of the effects of the arrangement disclosed hereinabove, it may be assumed that the field winding 3 requires a current of 50 amperes flowing therethrough under stable conditions of full excitation of the motor 2, and that an effective excitation of 100 ampere turns due to the several windings on the field of the exciter 4 is required to produce an exciter voltage necessary to insure the passage of a 50 ampere current in the circuit of the motor field winding 3. It can be assumed that under these conditions the series differential winding 12 produces a de-magnetizing flux corresponding to 300 ampere turns; and hence the separately excited field 7 must produce a magnetizing flux corresponding to 400 ampere turns in order to produce the required effective field ampere turns of 100, corresponding to 50 amperes in the circuit of the field 3.

Now assume that it is desired to reduce the current in the circuit of the winding 3 to a minimum value of 20 amperes, the movable arm of controller 8 is actuated to its position against the stop 10 to reduce the current in the winding 7, so as to cause the energizing effect of the latter to be such as produces 160 ampere turns. Immediately following the adjustment of the controller 8 to its new position corresponding to this reduced energization of the winding 7, and because of the fact that a current of 50 amperes persists in the circuit of the field winding 3, the differential field 12, with this current therein still produces 300 ampere turns, the effect being to cause an effective energization of the field of the exciter of 140 ampere turns, in other words, causing a reversal of the polarity of this machine and operation of the latter as a motor furnished with stored energy supplied from the terminals of the motor field winding 3. Now, as the motor field current dies down from its original value of 50 amperes to its desired value of 20 amperes, the ampere turns of the differential series field 12 decrease until it has reached a value of 160 ampere turns, at which time there is no resultant effective field on the exciter, the motor field 3 being then practically short-circuited through the exciter armature and the field 12. As the current in the winding 3 decreases still further, the ampere turns of the differential winding 12 become less than those due to the separately excited winding 7, and the exciter potential again reverses, now becoming a generator whose voltage builds up to a stable value such as to produce the desired current of 20 amperes in the circuit of the motor field, the differential field 12 at this time producing 120 ampere turns, giving an effective field flux on the exciter corresponding to 160−120=40 ampere turns.

When it is desired to reduce the speed of the motor, the controller 8 is actuated to decrease the resistance in the circuit of the energizing winding 7, with consequent increased potential at the terminals of the armature 4. Because of the time constant of the winding 3, the current in the circuit of the latter winding does not immediately increase to the desired value corresponding to the new position of the controller 8, but persists momentarily at the original low value. However, the voltage at the terminals of the exciter quickly rises considerably above that required to maintain full current in the circuit of the winding 3 under stabilized conditions, this being due to the fact that, while the ampere turns due to the winding 7 have immediately risen to the desired value corresponding to the new adjustment of the controller 8, the ampere turns of the differential winding 12, in series with the motor field winding 3, momentarily remain at a reduced value until inductive effects of the winding 3 are overcome, this increased voltage at the exciter terminals dying down to a value which is normal for the new setting of the controller 8, at which time the current in the circuit has built up to its new stable value.

In this speed-decreasing operation, that is, building-up the field current of the motor 2 from a value of 20 amperes, incident to the position of the controller 8 which produces minimum excitation of the field winding 7, to a value of 50 amperes, corresponding to adjustment of the movable arm of the controller to its position, corresponding to maximum current in the field winding 7 corresponding to its production of 400 ampere turns, since the current in the motor field persists momentarily at its lower normal value of 20 amperes, the ampere turns due to the differential winding 12 momentarily remain at 120, the result being that the field flux of the exciter now corresponds to 400−120, or 280, ampere turns, producing a super-normal or abnormally high voltage at the terminals of the exciter, and this is effective to apply an initial super-normal voltage kick on the winding 3, which greatly speeds the building-up of the motor field current to its desired value of 50 amperes, this high voltage gradually decreasing, through increase in the bucking ampere turns due to the differential field winding 12 to their normal value of 300.

In the modification of the invention shown in Fig. 2, the constant potential auxiliary exciter 6, with its self-excited shunt winding 9, is connected in series with the variable potential main exciter 4 to supply the field winding 3 of the motor 2, the auxiliary exciter 6 serving to determine the minimum stable current flowing in the field winding 3. The main separately excited winding 7 of the exciter 4 may be provided with an adjusting controller 8 there being no special necessity for providing the same with a stop, corresponding to stop 10 of Fig. 1, for insuring a predetermined minimum current in field winding 7.

Under operating conditions of the motor at less than full speed, the voltage impressed on the winding 3 is the sum of the constant potential developed by the auxiliary exciter 6 and the adjustable potential developed by the main exciter 4, this latter potential being due to the resultant ampere turns of the main winding 7 of variable resistance and the differential series winding 12.

In the operation of weakening or discharging the field 3 of the motor 2, the movable arm of the controller 8 is shifted to insert resistance in and eventually open the circuit of, or otherwise render ineffective, the winding 7 of the exciter 4, the ampere turns of the winding 12 at this time causing the exciter 4, under reversed field polarity, to operate as a motor absorbing energy from the circuit of the auxiliary exciter 6 and the stored energy discharged by field 3. As the stored energy of the winding 3 becomes dissipated, the auxiliary exciter 6 preponderates over the exciter 4 in the energization of the field winding 3 of the motor, insuring the required minimum excitation of this field winding, this being incident to an effective voltage which is the difference between that generated by the auxiliary exciter 6 and that due to the main exciter 4 which at this time operates with a motor effect corresponding to only the ampere turns of the differential winding 12.

In the operation of building-up the field 3 of the motor 2, the controller 8 may be actuated to its normal position corresponding to the desired energization of the field 3, the ampere turns due to the winding 7 predominating over those due to the winding 12, and the effective voltage applied to the winding 3 being then the sum of the voltages at the terminals of the main and auxiliary exciters. As explained hereinabove in connection with Fig. 1, the full de-energizing ampere turns of differential field 12 do not become effective until field 3 is fully built-up, and hence a super-normal voltage is generated initially by main exciter 4, thus increasing the rate of building-up of the current in the field winding 3.

In Fig. 3, features of the present invention are shown as being utilized in the control of the voltage of a variable and reversible generator 1 having a field winding 3$^a$ and driven by the prime mover 5 which also drives a main exciter 4 provided with a separately excited main field winding 7 and a differential series field 12, generally similar to the windings of the exciter 4 of Fig. 1. The motor or prime mover 5 may also drive a constant potential, self-excited auxiliary or pilot exciter 6 for supplying the field winding 7 as in Fig. 1. The generator 1 may supply the armature of a rolling mill, or the like, reversible motor.

In the operation of reversing the potential at the terminals of the generator 1 which may be connected to supply the reversible motor, it may be assumed that it is desired to actuate the movable arm of the controller 16 to decrease the current in the field winding 7 of the exciter and increase such current in the opposite direction. During and following the current-decreasing operation of the controller 16, and the consequent reduction of the voltage at the terminals of tohe exciter, the stored energy discharge by the main field winding 3$^a$ of the generator is effective, in a manner that will be apparent from the description hereinabove as to the system of Fig. 1, to produce a quickened deenergization of the field 3$^a$ of the generator, due to the motor effect incident to the differential winding 12 and the consequent speedy dissipation of this stored field eneregy in a useful manner. And as the rheostat 16 is shifted into position to initiate and secure normal operation of the generator 1 with reversed potential of the desired value at its terminals, this differential winding 12, then exerts minimum effect in preventing the quick building-up of the desired energy in the field winding 3ª of the generator, by reason of the fact that the initial current in the winding 12 is a minimum and builds up to maximum differential effect only when the normal stable current, incident to the particular position of the movable arm of the controller 16, flows in the winding 3ª of the generator, the result being that a super-normal voltage is available initially at the exciter terminals in building up the current in the generator field, with its consequent speeding-up effect, this voltage dying down to normal for the particular position of the movable arm of the rheostat 16.

Through the arrangements described hereinabove and particularly through the feature of automatically imposing desired substantial variations, due to the differential series winding, on the potential of the exciter during the operation of increasing and decreasing the current in the field winding of the machine 3, the time involved in changing from one to another speed or voltage of the controlled machine is greatly reduced.

In the modification shown in Fig. 4, features of the invention are applied to the regulation of an alternating current generator 1ª supplying a polyphase distribution system 20. The field winding 3ª of the generator is supplied from the exciter 4 which may be driven by the prime mover or motor 5 driving the generator, if the desired speed of the exciter can be readily attained in this manner. The exciter 4 has a main field winding 7 excited from the auxiliary exciter 6 and a supplemental field winding 12 in series with the armature and arranged differentially with respect to the main field winding 7. The auxiliary exciter 6 is preferably of the above described constant potential type having its field energized by the winding 9 of the self-excited shunt type. The energizing current in the winding 3ª of the generator is controlled through the automatic regulation of the current in the main winding 7 of the exciter 4, this latter winding having a resistance 21 in series therewith, and there being provided a conventional type of voltage regulator 23, preferably of the vibrating type, responsive to the voltage of the distribution circuit 20 to maintain substantially constant voltage on such circuit.

As will be apparent, in the operation of the system described hereinabove, the movable contact arm of the voltage regulator 23 is vibrating at a rate determined by the voltage on the system, the effect of these vibrations being to determine the average energizing effect due to the field winding 7 and hence the potential of the exciter and the effect of the field winding 3ª of the generator 1ª. The effect of reduced line voltage, such as may be incident to an excessive load on the line, is to permit the movable contact of the regulator 23 to short-circuit the resistance 21, thus increasing the current in the field winding 7 of the exciter, with consequent increase in the voltage generated by the exciter and applied to the terminals of the field winding 3ª of the generator. Because of the fact that the stable current in the winding 3ª is produced through the resultant energization of the main field 7 and the differential series field 12 of the exciter 4, it will be apparent that during building-up of the current in the field winding 3ª, the series field 12 exerts less demagnetizing effect on the field of the exciter 7 than it does under stable current conditions corresponding to the desired increased current in the field winding 3ª, with the result that the current is built up in the winding 3ª in less time than if its energization were due wholly to the effects of a field winding of the shunt type on the exciter. Likewise, in reducing the current in the winding 3ª of the generator, such as may be incident to momentary increase in voltage accompanying loss of a considerable portion of the load on the circuit 20, the effect of removing the short-circuit from the resistance 21 in the circuit of the main field winding 7, is to reduce the potential at the terminals of the exciter 4. However, this initial reduction of potential at the terminals of the exciter 4 is not immediately reflected at the terminals of the winding 3ª, because of the time constant of the latter, the stored energy of the latter tending to maintain the maximum current in the circuit of this winding and the differential series winding 12, with the result that the magnetization of the field of the exciter 4 is reduced initially below that corresponding to stable current value, and with proper design, may be reversed, to thereby cause actual momentary operation of the exciter 4 as a motor, absorbing stored energy discharged by the field winding 3ª, and thus greatly speeding up the attainment of stable operating conditions.

It will be apparent that, in the event of either increasing or decreasing the potential of the generator 1ª, the differential series winding is effective to reduce the time constant of the circuit of the field winding 3ª and permit greatly quickened response in the attainment or substantial maintenance of the required field flux and voltage of the generator 1ª.

The beneficial effects of the differential series winding 12, in reducing the time interval involved in the variation, particularly the dying-down, of the energization of the field of the main machine, may be supplemented, particularly in the case of generators where the maintenance at all times of a certain minimum field strength is not important as in the case of a motor, through the provision of a shunt type winding on the main exciter 4, supplied as from the constant potential auxiliary exciter 6. Provisions for the use of this expedient are indicated in Fig. 4, where a shunt field winding is indicated at 25, the circuit of this winding being provided with a switch for rendering this winding effective or ineffective, as desired, to exert a differential or de-magnetizing effect on the field during generator action of the exciter and hence effective magnetizing action during operation of the machine 4 as a motor. Through use of such a shunt field winding which may produce a differential effect that remains constant, the size of the differential series field 12 may be reduced, while securing the desired results as to de-magnetizing the field of the exciter 4 or producing a field effective to cause motor operation of this machine during a portion of the period of discharge of winding 3ª. However, the shunt winding involves greater inductance, and its use for de-magnetizing purposes may mean some sacrifice in the matter of increased speed of response of the system.

It will be apparent that any desired effective field energization may be secured through use of a differential series winding, such as 12, by providing a suitably selected or adjustable resistance in shunt to such winding.

Unless the motor 5 or prime mover is of the high speed type, it is preferable to drive the main and auxiliary exciters 4 and 6, respectively, by a separate high speed motor.

It should be understood that the invention claimed herein is not limited to the exact details of construction and design of the several embodiments set forth herein, for obvious modifications will be apparent to persons skilled in the art without departing from the spirit and scope of the invention as defined by the appended claims.

It is claimed and desired to secure by Letters Patent:

1. In combination, a dynamo-electric machine having a field winding, and an exciter for supplying said field winding, said exciter having a separately excited main field winding, and an auxiliary field winding of the series type, said series winding being arranged differentially with respect to said main field winding, the energization due to said main field winding predominating during stable current conditions in the circuit of the field winding of said dynamo-electric machine, and the energization due to said series type winding predominating momentarily and being effective to temporarily reverse the polarity of said exciter on the occurrence of a predetermined decrease in the potential developd by said exciter, whereby said exciter is caused to act as a motor to absorb stored energy of the field winding of said dynamo-electric machine during discharge thereof.

2. In combination, a dynamo-electric machine having a field winding, means for supplying variable energizing current to said field winding while insuring the presence of a predetermined minimum appreciable current in said winding, said means comprising an exciter having a separately excited main field winding, and an auxiliary winding for said exciter arranged differentially with respect to said main field winding, the relation between said main and auxiliary field windings of the exciter being such that said main field winding predominates during stable current conditions in the field winding of said dynamo-electric machine while said auxiliary field winding predominates to cause momentary reversal of the potential of said exciter on reduction of the current in the main field winding of said exciter to said predetermined minimum value.

3. In combination, a direct current motor having a field winding, an exciter for supplying energy to said field winding, said exciter having a main field winding supplied from a separate source, and an auxiliary field winding in series with the armature of said exciter and arranged differentially with respect to said main field winding, the energizing effect of said main field winding predominating over that of said auxiliary field winding during normal stable current conditions, and means for regulating said main field winding to vary the potential at the terminals of said exciter between a maximum and a predetermined minimum positive value, said series field winding being effective on the reduction of the energization of said exciter to said predetermined minimum value to cause reversal of the potential of said exciter and operation of the latter as a motor supplied with stored energy discharged by the field winding of said motor.

4. In combination, a dynamo-electric machine having a field winding, and an exciter for supplying said field winding, controllable means for causing desired effective energization of the field of said exciter, said energizing means including a separately excited energizing winding effective to produce a generator voltage at the terminals of the exciter, and an energizing winding carrying current proportional to that in the circuit of the field winding of said dynamo-electric machine and exerting a differential effect on said exciter opposite to and only partially neutralizing that of said separately excited winding under normal stable current conditions, and effective on decrease of voltage developed by said exciter to cause a momentary reversal of the voltage developed by the exciter.

5. In combination, a direct current generator connected to supply an inductive load, and having energizing means for magnetizing the field of said generator in a direction to produce a generator voltage at the terminals of the generator, the degree of said magnetization being independent of the voltage produced at the terminals of the generator, means for regulating the energizing effect of said energizing means, and means responsive to a voltage-decreasing operation of said regulating means for causing a momentary reversal of the polarity at the terminals of said generator and the operation thereof as a motor without reversal of the direction of current flow in the armature circuit of said generator.

6. In combination, a direct current generator connected to supply an inductive load, and having energizing means for magnetizing the field of said generator in a direction to produce a generator voltage at the terminals of the generator, the degree of said magnetization being independent of the voltage produced at the terminals of the generator, means for regulating the energizing effect of said energizing means, and means responsive to a voltage-decreasing operation of said regulating means for causing a momentary reversal of voltage developed by said generator.

7. A field forcing excitation system comprising in combination, a dynamo-electric machine having a field winding, an exciter connected so as to supply exciting current to said field winding, said exciter having a separately excited field winding, and means operable to vary the ampere-turns of said separately excited field winding so as to vary the exciting current supplied to said dynamo-electric machine, said exciter also having a differential field winding connected so as to be energized in accordance with the magnitude of the exciting current supplied to said dynamo-electric machine, said differential field winding having its number of turns so predetermined that the ampere-turns thereof are less than the ampere turns of said separately excited field winding during normal stable operation of said dynamo-electric machine throughout the range of said ampere-turns varying means and being effective on reduction of the energizing effect of said separately excited field winding to a predetermined positive value to cause said generator to reverse its polarity and operate momentarily as a motor to dissipate energy of discharge of the field winding of said dynamo electric machine without reversal of current flow therein.

8. In combination, a dynamo-electric machine having a field winding, and an exciter for supplying said field winding, controllable means for causing desired effective energization of the field of said exciter, said energizing means including a separately excited energizing winding effective to produce a generator voltage at the terminals of the exciter, and an energizing winding carrying current proportional to that in the circuit of the field winding of said dynamo-electric machine and exerting a differential effect on said exciter opposite to and only partially neutralizing that of said separately excited winding under normal stable magnetization of the field of said dynamo electric machine and effective on substantial decrease of the energizing effect of said separately excited winding to cause temporary reversal of polarity of said exciter without permitting reversal of current flow in the circuit of the field winding of said dynamo electric machine.

NATHAN WILKINSON.